July 10, 1945. P. R. HORNBROOK 2,380,310
CONVEYING APPARATUS
Filed July 17, 1943 2 Sheets-Sheet 1

INVENTOR.
Philip R. Hornbrook
BY
Pennie Davis Marvin Edmonds
Attorneys

July 10, 1945. P. R. HORNBROOK 2,380,310
CONVEYING APPARATUS
Filed July 17, 1943 2 Sheets-Sheet 2
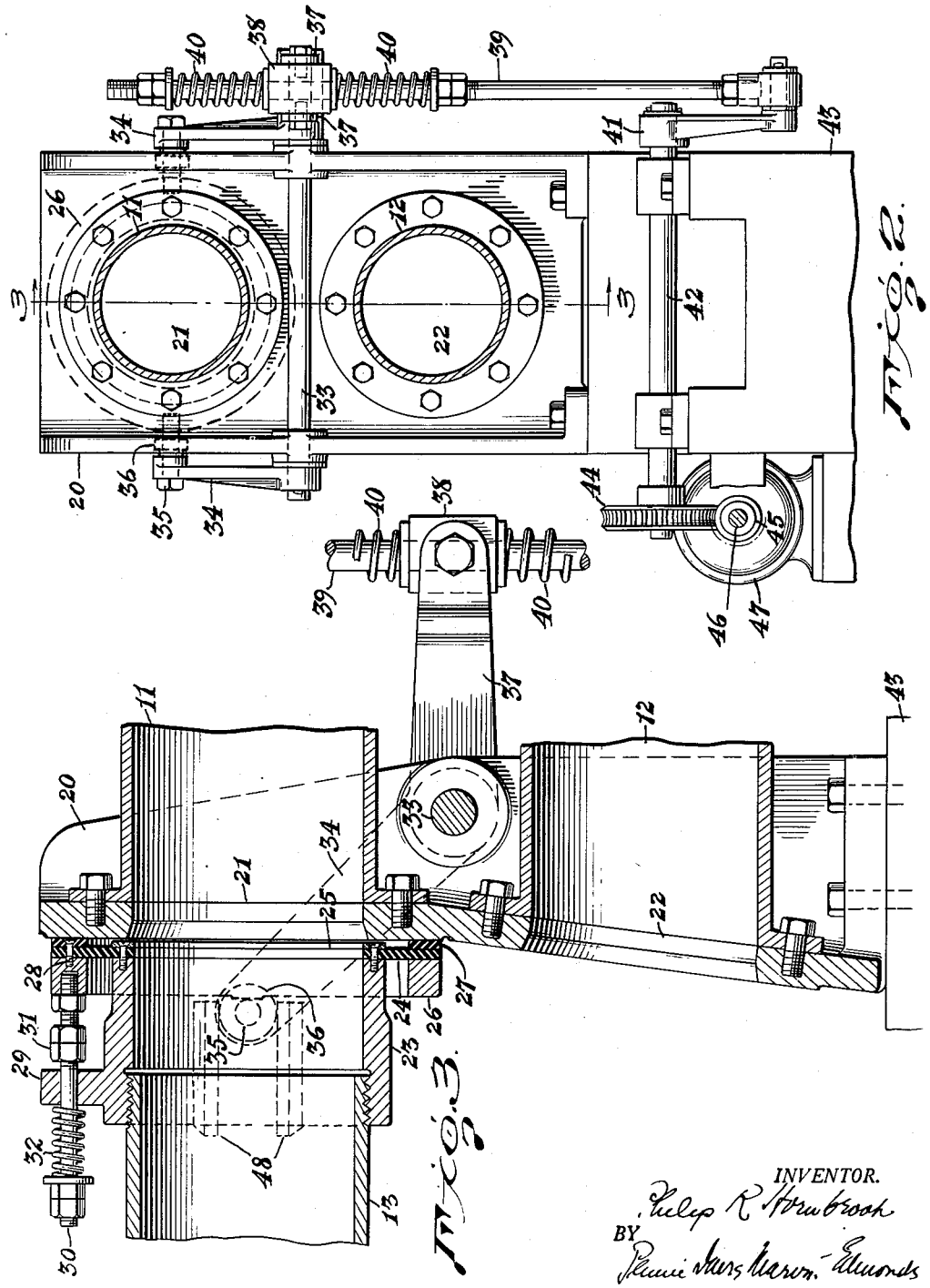
INVENTOR.
Philip R. Hornbrook
BY Patented July 10, 1945

2,380,310

UNITED STATES PATENT OFFICE 2,380,310

CONVEYING APPARATUS

Philip R. Hornbrook, Allentown, Pa., assignor to Fuller Company, Catasauqua, Pa., a corporation of Delaware Application July 17, 1943, Serial No. 495,137

8 Claims. (Cl. 302—28)

The present invention relates to pneumatic conveying apparatus for pulverulent, granular and crushed material and of the type which includes a central supply bin for such material, plural receivers or other locations to which it is desired to transport the material, a conduit or conduits, a positive-pressure means for maintaining the necessary air velocity through the conduit or conduits to carry a mixture of air and material through the conduit or conduits to the receivers or other locations and a switch mechanism interconnecting selected conduits or main conduits with branch conduits as desired, to facilitate shifting the air and entrained material from one conduit to another or to a selected branch conduit. More particularly, the invention is concerned with apparatus of the type described in which novel means are employed to control the flow of material and air from conduit to conduit or branch, so that material may be directed in the direction in which it is desired to transport it and to a selected destination. The new switch has general utility, but for the purposes of explanation, its use in connection with the handling of coal from a conduit to one of two branches will be described.

In plants which use large quantities of coal, it is the usual practice to have the coal delivered at a central point, usually adjacent suitable mills where the coal is reduced to the desired size. The material from the mills is then directed to a hopper from which it is fed to a pneumatic conveying apparatus for distribution to receivers or other equipment at a plurality of points in different parts of the plant.

Heretofore it has been the practice to construct conveying systems with switch mechanisms whereby the material may be diverted from one conduit to another. Where these switches are of the rotary type excessive wear soon results in leakage of entrained material past the valve no matter in which position it may be. The failure of these valves to remain tight results in material deposits around the periphery of the rotary member and subsequent failure of the valve to respond to its operating mechanism. An important problem lies in the seal itself and its manner of actuation so that both leakage and resultant wear may be eliminated. At the same time simple and positive action must be assured.

The present invention is, accordingly, directed to the provision of apparatus for conveying pulverulent, granular and crushed material in which material is caused to flow through a conduit by a differential of pressure to one of several conduits or branches, the new apparatus including novel means to divert the material to the selected conduit or branch in a manner to insure positive action and eliminate leakage.

The apparatus of the invention comprises a main conduit having a positive pressure means connected to one end in order to maintain a differential of pressure in the conduit and cause a flow of air and material therethrough. In the conduit and connected thereto at one end by a flexible nipple is a pivoted section mounted to have its free end swung into alignment with any one of a plurality of conduits and to be connected with a seat on the registering conduit portion by novel sealing means. The sealing means are such that when the pivoted section is to be shifted the seal first is broken by limited movement of translation of the sealing means away from its seat, after which stop means prevent further movement of translation and the entire pivoted section is swung about its pivot to another conduit portion and the seal with such other conduit portion effected by another and reverse movement of translation. This construction and operation entirely eliminates that sliding action at the sealing face which has been the source of so much trouble in this type of equipment. Because of this new seating mechanism the operation of the switch with material having abradant characteristics is possible with greatly reduced wear and resultant long life.

For a better understanding of the invention, reference may be had to the accompanying drawings in which:

Fig. 2 is an end elevation partly in section showing the operating elements.

Fig. 3 is a section along line 3—3 of Fig. 2.

Figure 1:
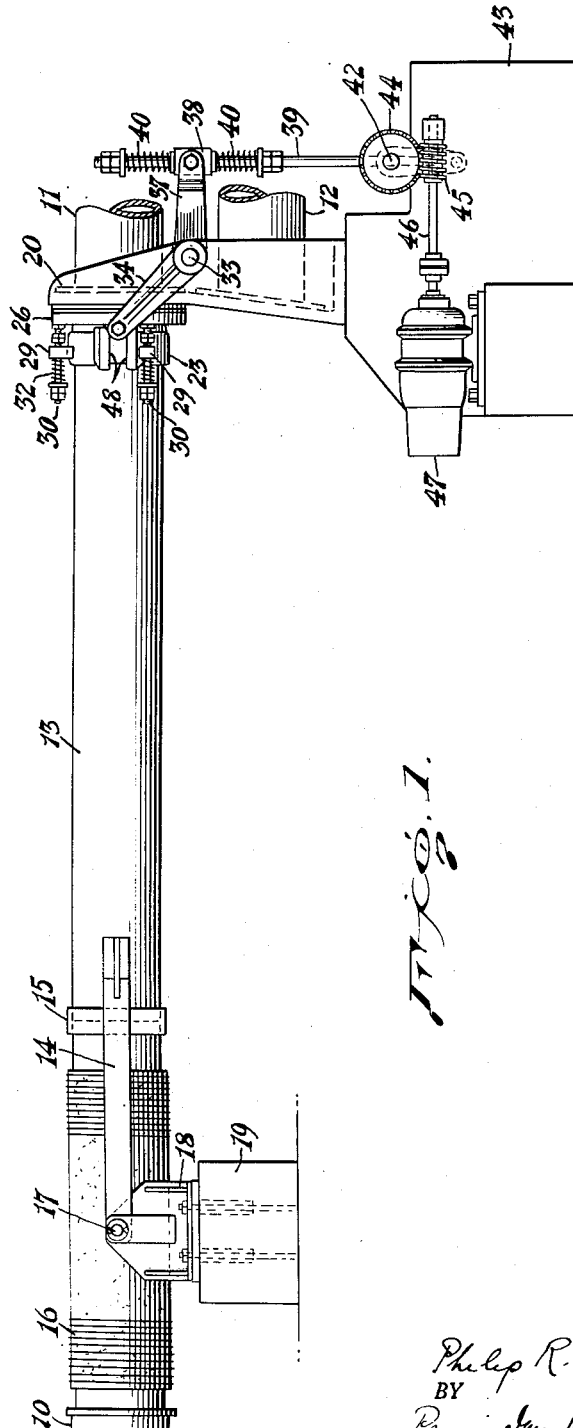
Fig. 1 is an elevation of the entire switch mechanism.

Referring now to the drawings, the apparatus illustrated will be seen to include a main conduit 10 and two branch conduits 11 and 12. A swinging section 13 has two arms 14 welded or otherwise fastened thereto and spaced by spacer ring 15. Swinging section 13 is joined with main conduit 10 by flexible nipple 16 of rubber or equivalent material. Arms 14 extend to about the middle of nipple 16 where they are pivoted on pins 17 carried in trunnion plates 18 anchored on block 19.

Branch conduits 11 and 12 are mounted in housing 20 and register with holes 21 and 22 therein respectively which may be regarded as subtending spaced arcs on a circle the center of which lies at pin 17. A cylindrical mounting member 23 is threaded to the end of swinging section 13 opposite arms 14 and has an annular rubber flange 24 mounted on its free end where it is held in place by ring 25 and associated screws. An annular backing member 26 spaced from cylindrical mounting member 23 is fastened to the side of flange 24 toward section 13 while on the opposite side of flange 24 facing housing 20 is mounted seating gasket 27 having substantially the same projected area as backing member 26 to which it is fastened by a plurality of fastening means 28 which pass through gasket 27, flange 24 and into backing member 26. Outstanding lugs 29 slidably receive studs 30 which screw into backing members 26 and carry stop nuts 31 which may be set a desired distance from lugs 29 against which they are intended to bear. Compression springs 32 are provided to function as will later appear.

Shaft 33 is journaled in housing 20 and has keyed thereto a pair of parallel arms 34 which are provided with pins 35 on which rollers 36 are mounted. Another arm 37 angularly disposed to arms 34 is likewise keyed to shaft 33. Arm 37 is connected to block 38 which slidably floats on connecting rod 39 under the action of compression springs 40. Connecting rod 39 is mounted on crank arm 41 keyed to shaft 42 journaled in base block 43 which likewise mounts housing 20. Worm wheel 44 is mounted on the end of shaft 42 and mates with worm 45 mounted on motor shaft 46 driven by motor 47. Rollers 36 move in horizontal ways 48 mounted on cylindrical member 23.

The operation of the invention is as follows. After sufficient material has flowed from conduit 10 through section 13 to conduit 11 or vice versa, or if for any other reason it becomes desirable, motor 47 is actuated by, for example, a remote switch controlled in turn by the fuel level in a receiver of the like, to connect conduit 10 with conduit 12. Through shaft 46, worm 45, worm wheel 44, and crank arm 41 upward motion is transmitted to connecting rod 39. As connecting rod 39 moves upward under the action of crank arm 41, block 38 moves upward slightly under the increasing force of lower compression springs 40. Connecting rod 39 slides through block 38, increasing the compression of lower spring 40. This slight initial movement of block 38 moves arm 37 upward an equal amount, rotating shaft 33 through a few degrees counter clockwise, as viewed in Fig. 1, and arms 34 mounted thereon. Initial rotation of arms 34 causes pins 35, which, when section 13 is in sealing engagement with either of the branch conduits 11 or 12, bear against the backing member 26, to move away from said backing member, thus permitting springs 32 to move the gasket 27 carried by flange 24 from the sealing face around hole 21 of housing 20. Where it is desired to decrease the initial downward component of the force exerted by arms 34, pivot 33 may be moved closer to the seating face of housing 20 and the angle between arms 34 and arm 37 brought as close to 90 degrees as desired. Movement of translation of member 26 is quite short and ceases when stop nuts 31 bear upon projecting lugs 29. Nuts 31 may be adjusted upon rods 30 in order to vary the retraction of the sealing means upon release of the backing member 26.

At this point crank arm 41 has advanced to about the position where the vertical component of its motion is a maximum and the compression of lower spring 40 is such that block 38 is suddenly moved upward quickly, rotating arms 34 downward and pivoting section 13 about pin 17. Nipple 16 flexes as section 13 swings downward to a position opposite hole 22 and connecting rod 39 pivots forward to allow for the arcuate swing of block 38 attached to arm 37. As the end of section 13 approaches registration with hole 22 upper spring 40 cushions block 38 against overtravel. Rollers 35 ride in ways 48 and guide section 13 accurately into position while connecting rod 39 continues the last portion of its upward motion. In this phase section 13 is stationary and arms 34 and rollers 35 draw backing member 26 toward housing 20 together with sealing gasket 27 thus causing stop nuts 31 to move away from lugs 29 and placing springs 32 under compression. Flange 24 flexes and gasket 27 makes a tight seal against the face of housing 20 under the force of lower spring 40 which has again been placed under compression and will so continue until the next cycle of operation. The seating of gasket 27 takes place with no sliding movement at the seating face, thus eliminating wear. Satisfactory continuous operation will require the maintenance of the proper compression in both upper and lower compression springs 40 and in the space allowed between stop nuts 31 and lugs 29.

I claim:

1. In pneumatic conveying apparatus for material to be conveyed by a fluid including a conduit portion, a movable section so connected thereto at one end as to be in communication therewith at all times, a plurality of conduit portions having open ends positioned near and opposite the path of movement of the distal end of said movable section, means for moving said movable section into alignment with a selected one of said plurality of conduits, so that said first-mentioned conduit portion, said movable section, and the conduit of said plurality of conduits with which the movable section is aligned will form a continuous passage, means for sealing the distal end of said movable section to the open end of the selected conduit portion of said plurality of conduit portions comprising a flexible flange extending outwardly in a generally radial direction from the distal end of said movable section, sealing means at the outer portion of said flexible flange, and means for moving the outer portion of the flexible flange and said sealing means in translation and towards said selected conduit to effect a tight joint therewith.

2. In pneumatic conveying apparatus for material to be conveyed by a fluid including a conduit portion, a movable section so connected thereto at one end as to be in communication therewith at all times, a plurality of conduit portions having open ends positioned near and opposite the path of movement of the distal end of said movable section means for moving said movable section into alignment with a selected one of said plurality of conduits, so that said first-mentioned conduit portion, said movable section, and the conduit of said plurality of conduits with which the movable section is aligned will form a continuous passage, means for sealing the distal end of said movable section to the open end of the selected conduit portion of said plurality of conduit portions comprising a flexible flange extending outwardly in a generally radial direction from the distal end of said movable section, a sealing gasket carried by said flexible flange at the side thereof adjacent the open ends of said conduit portions, a backing member mounted on the opposite side of the flexible flange and opposite the sealing gasket, said backing member being spaced radially outwardly from said movable section, and means for moving the outer portion of the flexible flange, and the backing member and sealing gasket carried thereby, in translation and towards a selected conduit to effect a tight joint.

3. In pneumatic conveying apparatus for material to be conveyed by a fluid including a conduit portion, a movable section so connected thereto at one end as to be in communication therewith at all times, a frame member having a plurality of conduit portions mounted therein, said conduit portions having open ends positioned near and opposite the path of movement of the distal end of said movable section, means for moving said movable section into alignment with a selected one of said plurality of conduits, so that said first-mentioned conduit portion, said movable section, and the conduit of said plurality of conduits with which the movable section is aligned will form a continuous passage, means for sealing the distal end of said movable section to the open end of the selected conduit portion of said plurality of conduit portions comprising a flexible flange extending outwardly in a generally radial direction from the distal end of said movable section, sealing means at the outer portion of said flexible flange, and means mounted on said frame member for moving the outer portion of the flexible flange, and the sealing means carried thereby, in translation and towards a selected conduit to effect a tight joint therewith.

4. In pneumatic conveying apparatus for material to be conveyed by a fluid including a conduit portion, a movable section so connected thereto at one end as to be in communication therewith at all times, a plurality of conduit portions having open ends positioned near and opposite the path of movement of the distal end of said movable section, means for moving said movable section into alignment with a selected one of said plurality of conduits, so that said first-mentioned conduit portion, said movable section, and the conduit of said plurality of conduits with which the movable section is aligned will form a continuous passage, means for sealing the distal end of said movable section to the open end of the selected conduit portion of said plurality of conduit portions comprising a flexible flange extending outwardly in a generally radial direction from the distal end of said movable section, a sealing gasket carried by said flexible flange at the side thereof adjacent the open ends of said conduit portions, a backing member mounted on the opposite side of the flexible flange and opposite the sealing gasket, said backing member being spaced radially outwardly from said movable section, means for moving the outer portion of the flexible flange, and the backing member and sealing gasket carried thereby, in translation and towards a selected conduit to effect a tight joint and in translation in the opposite direction to break a seal formed therewith, means for limiting said movement of translation in said opposite direction comprising a lug extending outwardly from the movable section, a rod connected to said backing member and extending through said lug and adjustable stop nuts on said rod between said lug and said backing member, and resilient means on said rod urging said lug and said backing member together.

5. In pneumatic conveying apparatus for material to be conveyed by a fluid including a conduit portion, a movable section so connected thereto at one end as to be in communication therewith at all times, a frame member having a plurality of conduit portions mounted therein, said plurality of conduit portions having open ends positioned near and opposite the path of movement of the distal end of said movable section, means for moving said movable section into alignment with a selected one of said plurality of conduits, so that said first-mentioned conduit portion, said movable section, and the conduit of said plurality of conduits with which the movable section is aligned will form a continuous passage, means sealing the distal end of said movable section to the open end of the selected conduit portion of said plurality of conduit portions comprising a flexible flange extending outwardly in a generally radial direction from the distal end of said movable section, sealing means at the outer portion of said flexible flange, a backing member mounted on the flexible flange opposite the sealing means at the outer portion thereof, said backing member being spaced radially outwardly from said movable section, means mounted on said frame member for moving the outer portion of the flexible flange and the backing member in translation to effect a tight joint with a selected conduit of said plurality of conduit portions, and means for limiting movement of the outer portion of the flexible flange, and the backing member and sealing means at the outer portion thereof in translation, away from the open end of a selected conduit portion.

6. In pneumatic conveying apparatus for material to be conveyed by a fluid including a conduit portion, a movable section so connected thereto at one end as to be in communication therewith at all times, a frame member having a plurality of conduit portions mounted therein, said plurality of conduit portions having open ends positioned near and opposite the path of movement of the distal end of said movable section, means for moving said movable section into alignment with a selected one of said plurality of conduits, so that said first-mentioned conduit portion, said movable section, and the conduit of said plurality of conduits with which the movable section is aligned will form a continuous passage, means sealing the distal end of said movable section to the open end of the selected conduit portion of said plurality of conduit portions comprising a flexible flange extending outwardly in a generally radial direction from the distal end of said movable section, sealing means at the outer portion of said flexible flange, a backing member mounted on the flexible flange opposite the sealing means at the outer portion thereof, said backing member being spaced radially outwardly from said movable section, means mounted on said frame member for moving the outer portion of the flexible flange and the backing member in translation to effect a tight joint with a selected conduit of said plurality of conduit portions, the means for imparting said movement in translation comprising a pair of arms pivotally mounted on said frame member and having parts carried thereby adapted to bear against the backing member, and means for swinging said arms about their pivotal connections with the frame so that the parts carried thereby which bear against the backing member will press the outer portion of said flexible flange carrying the sealing means about the open end of a selected conduit portion to effect a tight seal.

7. In pneumatic conveying apparatus for material to be conveyed by a fluid including a conduit portion, a movable section so connected thereto at one end as to be in communication therewith at all times, a frame member having a plurality of conduit portions mounted therein, said plurality of conduit portions having open ends positioned near and opposite the path of movement of the distal end of said movable section, means for moving said movable section into alignment with a selected one of said plurality of conduits, so that said first-mentioned conduit portion, said movable section, and the conduit of said plurality of conduits with which the movable section is aligned will form a continuous passage, means sealing the distal end of said movable section to the open end of the selected conduit portion of said plurality of conduit portions comprising a flexible flange extending outwardly in a generally radial direction from the distal end of said movable section, sealing means at the outer portion of said flexible flange, a backing member mounted on the flexible flange opposite the sealing means at the outer portion thereof, said backing member being spaced radially outwardly from said movable section, and means mounted on said frame member for moving the outer portion of the flexible flange, and the backing member carried thereby, in translation to effect a tight joint with the respective conduit portions, the means for imparting said movement of translation comprising a pair of arms pivotally mounted on said frame member and having parts carried thereby adapted to bear against the backing member, an arm connected to and actuating said pair of arms, a motor-actuated crank, a connecting rod connected to said crank, and means for actuating said arm from said connecting rod for swinging said pair of arms about their pivotal conection with the frame member so that the parts carried thereby will press against the backing member and press the flexible flange and the sealing means at the outer portion thereof about the open end of a selected conduit portion to effect a tight seal.

8. Pneumatic conveying apparatus for material to be conveyed by a fluid as set forth in claim 7 in which the means for actuating the arm connected to said pair of arms from the connecting rod includes a block slidably mounted on the connecting rod, means connecting said block and said arm, and resilient means urging the block to a normal positon on the connecting rod.

PHILIP R. HORNBROOK.